United States Patent [19]
Jacobson

[11] 4,426,554
[45] Jan. 17, 1984

[54] TAPE DRIVE TRANSFER SYSTEM FOR CASSETTE TELEPHONE ANSWERING DEVICE WITH REMOTE CONTROLLED PLAYOUT

[76] Inventor: Sava Jacobson, 8130 Orion St., Van Nuys, Calif. 91406

[21] Appl. No.: 343,728

[22] Filed: Jan. 29, 1982

[51] Int. Cl.³ .............................................. H04M 1/64
[52] U.S. Cl. .................................... 179/6.07; 360/93; 360/96.3
[58] Field of Search ............... 179/6.03, 6.07; 360/69, 360/74.1, 96.3, 137, 93

[56] References Cited

U.S. PATENT DOCUMENTS 4,394,697  7/1983  Kurosawa ............................ 360/91

FOREIGN PATENT DOCUMENTS 55-41049  3/1980  Japan ................................. 179/6.07

*Primary Examiner*—Robert L. Richardson
*Attorney, Agent, or Firm*—Spensley, Horn, Jubas & Lubitz

[57] ABSTRACT

In a magnetic tape cassette telephone answering device having a remote controlled playout capability, a tape drive transfer system is disclosed which utilizes motive power from the tape cassette drive motor to transfer the system into an automatic rewind mode.

The tape drive transfer system includes a transfer lever connected to a spindle drive assembly which alternately drives the takeup spindle or the source spindle of the incoming message tape cassette. The transfer lever is moved into driven engagement with the cassette drive motor by a low power solenoid that is actuated when a remote playout control signal is received. That motor drives the transfer lever and thereby conditions the spindle drive assembly from the forward to the rewind operating position. The transfer lever then is disengaged and latched. When the rewind is complete, the solenoid is deactuated. This releases the transfer lever from its latched position and permits the transfer lever and spindle drive assembly lever to be biased back to the normal forward position in preparation for playout of the previously recorded messages.

A remote controlled fast forward option is available, by using a spindle drive assembly with a transferrable drive gear that is mounted on a pivotable floating arm. Fast forward operation is accomplished by first conditioning the tape drive transfer system to the rewind position and thereafter reversing direction of the cassette drive motor. This reverses the direction of the transferable drive gear, which by a frictional drag arrangement rotates the floating arm so that the drive gear engages the takeup spindle of the cassette for fast forward operation.

8 Claims, 16 Drawing Figures

TAPE DRIVE TRANSFER SYSTEM FOR CASSETTE TELEPHONE ANSWERING DEVICE WITH REMOTE CONTROLLED PLAYOUT

BACKGROUND OF THE INVENTION

1. Field of the Invention

The present invention relates to a cassette telephone answering device wherein, during remote controlled playout of previously received messages, the cassette drive motor itself provides the primary motive force to transfer the device into rewind prior to automatic message playout.

The present application is related to the inventor's Disclosure Document No. 100275 filed May 21, 1981 entitled "Power-Assist Rewind Function for (Remote-Triggered) Telephone Answering Device."

2. Description of the Prior Art

Remote controlled playout of previously recorded incoming messages is a highly desirable feature in a telephone answering device. It allows the user to receive his messages while he is away from home or office. To do this, the user calls his own telephone number. As the call is being automatically answered by the answering device, the user transmit a beep tone, security code or other control signal over the telephone line. Receipt of this remote control signal causes the telephone answering device to interrupt the answering cycle, to rewind the incoming message record tape, and thereafter to play back the messages from that tape via the telephone line to the user.

To facilitate such remote controlled playout operation, the answering device must have a means for transferring the drive mechanism for the incoming message tape from the forward (record or play) condition to the rewind mode, and for replacing the drive mechanism in the forward mode when rewind is complete. In the past, such drive transfer mechanisms have required either an additional motor or a relatively high powered solenoid to accomplish the transfer. Both techniques are relatively costly, precluding their use in a telephone answering device of very low cost. By contrast, it is an objective of the present invention to provide a low cost telephone answering device having remote controlled playout capability.

Typical of the prior art remote playout control mechanisms using an additional motor to accomplish the message tape drive transfer operation are the inventors' U.S. Pat. No. 4,104,487, No. 4,197,426, No. 4,201,888 and No. 4,236,044. In each of these, a separate motor operates a cam assembly which transfers the incoming message tape drive between the forward and rewind conditions. An object of the present invention is to provide a drive transfer mechanism which does not use a separate motor, but which instead uses motive power provided by the tape drive motor itself to accomplish the transfer from forward to rewind condition.

Prior art solenoid-type transfer mechanisms have required a fairly high powered solenoid to accomplish the drive transfer and to retract the recording head away from the message tape during the remote controlled rewind operation. Such a hefty solenoid is required to overcome the roughly one pound of force which typically is exerted to maintain the recording head in secure contract with the incoming message tape. Moreover, the utilized power supply must be able continuously to maintain the solenoid in the actuated condition. This is so since qualification tests, such as those performed by Underwriters Laboratories, assume that the solenoid actuating circuitry may become "stuck" with the solenoid energized. Thus the power supply must be capable of continuously supplying the high current required by the solenoid. This adds to the cost and size of the unit. Another object of the present invention is to provide a drive transfer mechanism which uses a very low powered solenoid to initiate the drive transfer, but which uses motive power supplied by the tape drive motor itself to accomplish the actual transfer from the forward to the rewind mode. This eliminates the need for a high continuous current power supply for the solenoid.

In the inventor's copending U.S. patent application Ser. No. 260,360 filed May 4, 1981 and now U.S. Pat. No. 4,385,205, there is disclosed a cassette drive assembly for a telephone answering device in which a single motor alternately drives only the outgoing announcement tape cassette or only the incoming message tape cassette, depending solely upon the direction of rotation of the motor. Such a system is particularly advantageous since only a single drive motor is required, thereby minimizing the unit cost. Moreover, since only one or the other of the tape cassettes is driven at one time, the answering announcement is not recorded onto the incoming message tape, so that one incoming message immediately follows another on that tape. This maximizes the number of incoming messages which can be recorded on the cassette, and minimizes the playback time needed for the user to listen to his messages. A further object of the present invention is to provide a telephone answering device having a single motor cassette tape drive mechanism such as that disclosed in the inventor's copending U.S. patent application Ser. No. 260,360 but configured for remote controlled playout of the recorded incoming messages.

Another desirable feature in a telephone answering device is a remote controlled fast forward capability. This allows the user, when playing back messages under remote control, rapidly to skip over those which he does not wish to hear. It is particularly useful e.g., for rapidly scanning through the incoming message tape to find a particular message. A further object of the present invention is to provide an inexpensive tape cassette drive mechanism which readily can be transferred to a fast forward mode under remote control.

SUMMARY OF THE INVENTION

These and other objectives are achieved in a magnetic tape cassette telephone answering device of the type having a spindle drive assembly which alternately drives the takeup spindle or the source spindle of the incoming message tape cassette. This assembly is mounted on a pivotable spindle drive assembly lever having forward and rewind operating positions. Advantageously the record/playback head and the capstan pinch roller for the incoming message tape are mounted on a pivotable control arm which itself is moved out of engagement when the spindle drive assembly lever is set to the rewind operating position.

In accordance with the present invention, there is provided a tape drive transfer system that is interconnected with the spindle drive assembly lever. The tape drive system utilizes motive power provided e.g. by the same motor that drives the outgoing announcement tape cassette. When a remote playout control signal is received, a very low power solenoid is actuated. This solenoid moves a transfer lever into driven engagement with the cassette drive motor. That motor then drives the transfer lever through an appropriate distance and direction so as to move the spindle drive assembly lever from the forward to the rewind operating position, and to retract the control arm carrying the playback head. The motive power provided by the drive motor overcomes the usual force that is exerted to maintain the record/playback head in contact with the incoming message tape.

When the transfer lever has been moved to the position at which the spindle drive assembly is in the rewind mode, the transfer lever is disengaged from its driven relationship with the cassette drive motor and is latched in this position. Rewind of the incoming message tape takes place using the same drive motor to rotate the cassette source spindle via a gear drive train.

When the rewind is completed, the low power solenoid is deactuated. This releases the transfer lever from its latched position, and permits the transfer lever and the spindle drive assembly lever to be biased back to the normal forward position. As a result, the answering device is conditioned to play out the previously recorded messages.

In a preferred embodiment, the transfer lever includes a rack gear, and is attached for limited pivotable motion with respect to the spindle drive assembly lever. When the solenoid is actuated, upon receipt of the remote playout control signal, the solenoid pivots the transfer lever so that the rack gear engages a pinion gear driven by the cassette drive motor. Driving energy thus is imparted to the transfer lever via this pinion and rack arrangement.

When the transfer lever reaches the location at which the spindle drive assembly lever is in the rewind position, a wedge urges the transfer lever vertically out of engagement with the drive pinion. Further, the transfer lever is latched and held in the latched position by the actuated solenoid.

At the end of rewind, the solenoid is deactuated and a bias spring returns the transfer lever to the rest position. During this return motion, the transfer lever is pivoted out of contact with the pinion while a ramp also moves the transfer lever back into the same plane as the pinion in readiness for the next remote playout operation.

Advantageously the invention is used in a telephone answering device of the type in which both the outgoing announcement and incoming message tape cassettes are driven by the same motor through an appropriate one-way clutch arrangement. In such system only one or the other, but not both, of the cassettes are driven at one time, depending solely on the direction of rotation of the single drive motor.

A remote controlled fast forward option is available with the present invention by supplying the spindle drive assembly with a transferable drive gear that is mounted on a pivotable floating arm by a frictional drag arrangement. Fast forward operation is accomplished by first conditioning the tape drive transfer system to the rewind position (as outlined above) and thereafter reversing the direction of the single drive motor. This reverses the direction of the gear. The force imparted to the transferable drive gear swings the floating arm from the rewind to the forward position. In the resultant position the drive gear causes fast rotation of the message cassette take-up spindle. Fast forward operation results.

BRIEF DESCRIPTION OF THE DRAWINGS

A detailed description of the invention will be made with reference to the accompanying drawings wherein like numerals designate corresponding elements in the several figures.

DESCRIPTION OF THE PREFERRED EMBODIMENT

The following detailed description is of the best contemplated mode of carrying out the invention. This description is not to be taken in a limiting sense, but is made merely for the purpose of illustrating the general principles of the invention since the scope of the invention best is defined by the appended claims.

Figure 1:
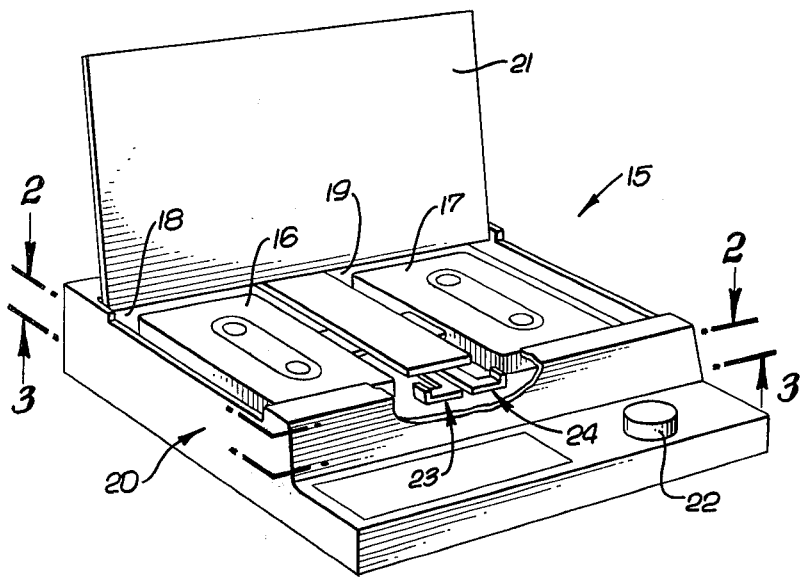
FIG. 1 is a perspective view of a magnetic tape cassette telephone answering device incorporating the inventive tape drive transfer mechanism for remote controlled playout.

Shown in FIG. 1 is a telephone answering device 15 which incorporates the inventive remote controlled playout drive transfer mechanism. The device 15 advantageously employs a reentrant loop magnetic tape cassette 16 that contains the outgoing announcement, and a magnetic tape cassette 17 onto which incoming messages are recorded. The manner in which the device 15 automatically answers a telephone call may be like that disclosed in the inventor's U.S. Pat. No. 3,780,226 entitled "Telephone Answering Apparatus", together with appropriate provision to reverse the direction of rotation of the single drive motor at the end of outgoing announcement transmission.

Figure 2:
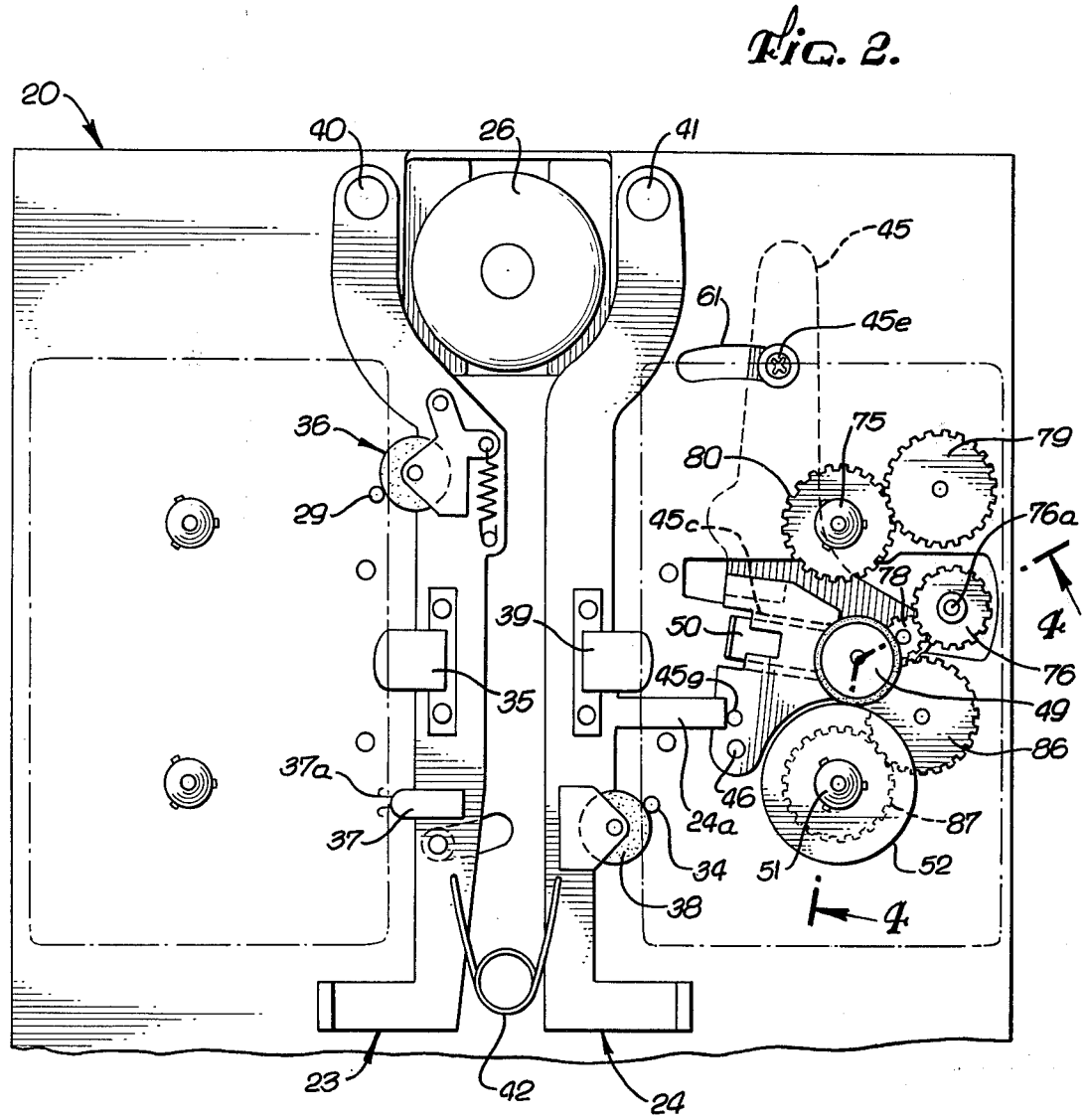
FIG. 2 is a top plan view of the device of FIG. 1, as seen along the line 2—2 thereof, showing the head retraction arms and the spindle drive assembly for the incoming message tape cassette.

The tape cassettes 16 and 17 are received in respective recesses 18, 19 of a chassis or housing 20 having a lid 21. Mode control functions, such as selection of the "answer", "rewind" or "playback" mode, are controlled by a switch 22. Insertion or removal of the cassettes 16 and 17 is facilitated by retraction of respective record/playback head carrier arms 23 and 24. In FIG. 2, these arms 23, 24 are shown in their normal non-retracted positions. FIG. 2 illustrates the configuration of the answering device 15 during normal automatic answering operation, prior to initiation of remote controlled playout.

Figure 3:
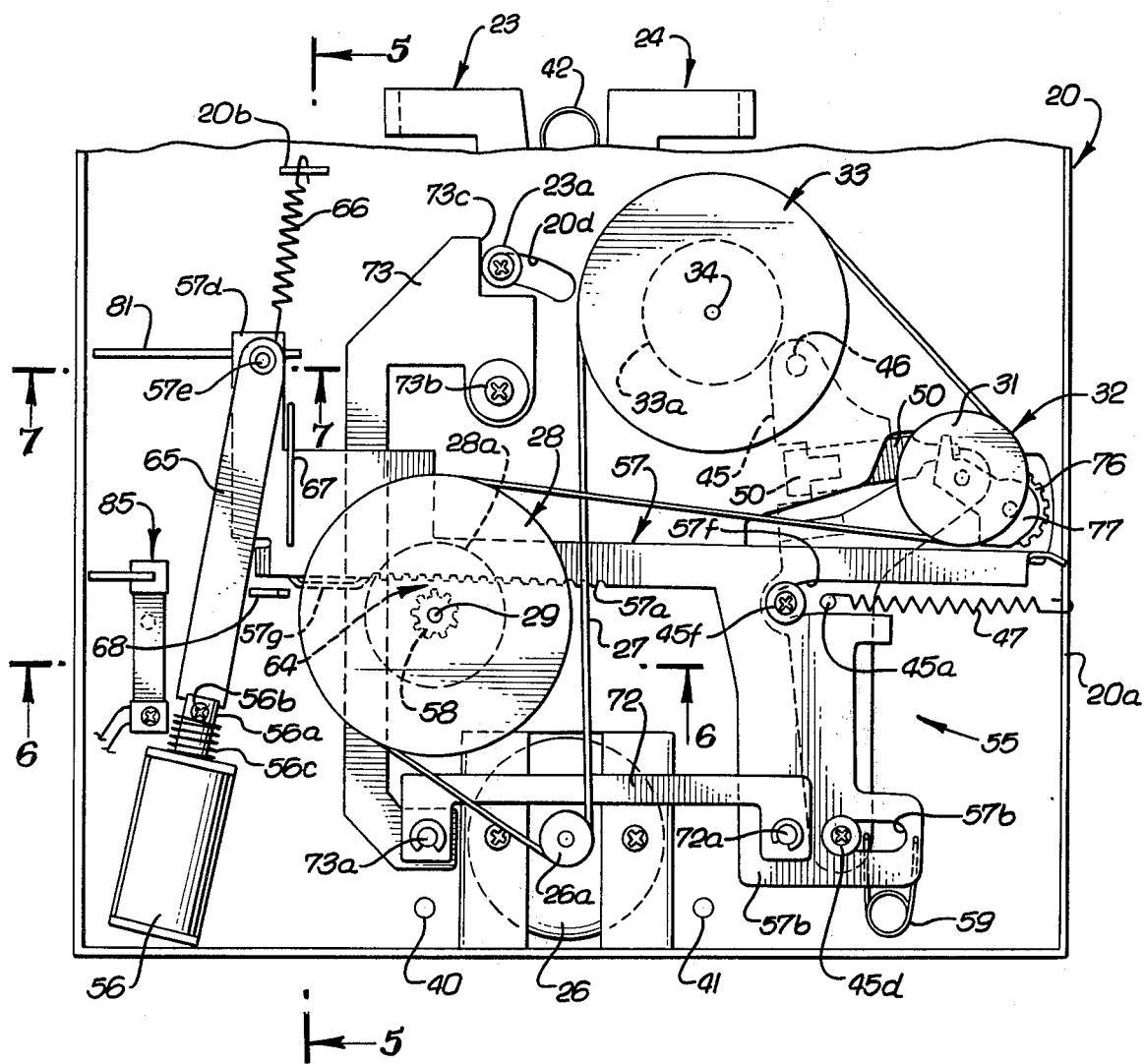
FIG. 3 is a bottom plan view of the device of FIG. 1, looking upward along the line 3—3 thereof, and showing the inventive tape drive transfer mechanism in the "forward" position. The answering device is in this configuration (of FIGS. 1 and 3) during the normal answering cycle prior to initiation of remote controlled playout.
Figure 5:
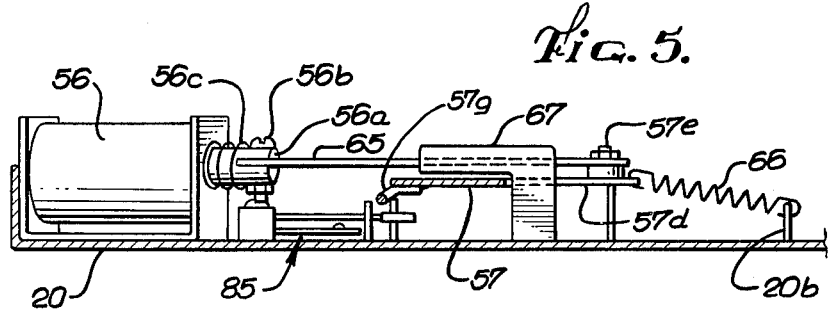
FIG. 5 is a transverse sectional view, as seen along the line 5—5 of FIG. 3, showing the drive transfer initiation solenoid and linkage in the "forward" mode.

The outgoing announcement tape cassette 16 and the incoming message tape cassette 17 are alternatively driven by a single drive motor 26 (FIGS. 2 and 3). When the motor 26 is rotated clockwise as viewed from below (FIG. 3) only the outgoing announcement tape cassette 16 will be driven. The drive force is transmitted from the motor 26 via a pulley 26a, a belt 27 and a flywheel 28 which is connected to the tape drive capstan 29 (FIG. 2) via a one-way clutch 28a, all as disclosed in the inventor's above identified copending patent application Ser. No. 260,360. The belt 27 also loops around a wheel 31 associated with a spindle drive assembly 32 (described below) and around a flywheel 33. The flywheel 33 is connected via another one-way clutch 33a to the tape drive capstan 34 associated with the incoming message tape cassette 17. As also described in the above mentioned U.S. patent application Ser. No. 260,360 the one-way clutch 33a associated with the flywheel 33 is configured so that when the motor 26 rotates clockwise (as viewed in FIG. 3) to drive the announcement tape capstan 29, the flywheel 33 will be disengaged from the capstan 34 so that no movement is imparted to the incoming message tape while the outgoing announcement is transmitted.

The outgoing announcement is picked up by a record/playback head 35 that is mounted on the carrier arm 23. Pivotly mounted to the arm 23 is a spring-bias pinch roller assembly 36 which urges the tape against the capstan 29 when the carrier arm 23 is in the position shown in FIG. 2.

At the end of outgoing announcement transmission, a conductive strip on the cassette tape 16 shorts a pair of electrical contacts 37a mounted to a post 37 on the carrier arm 23. In a known manner, shorting of these contacts 37a causes the device 15 to switch from the outgoing announcement transmit mode to the incoming message record mode. When this happens, the direction of rotation of the motor 26 is reversed. During the resultant counterclockwise rotation of the motor 26 (FIG. 3), the one-way clutch 28a associated with the flywheel 28 becomes disengaged, so that the capstan 29 is not driven, thereby stopping movement of the outgoing announcement tape. However, the one-way clutch 33a associated with the flywheel 33 does drive the capstan so as to impart movement to the incoming message tape in the cassette 17. The tape is held against the capstan 34 by a pinch roller 38 (FIG. 2) mounted on the carrier arm 24. The incoming message is recorded via a record/playback head 39 also mounted on the arm 24. The head carrier arms 23 and 24 are mounted to the chassis 20 by respective pivots 40, 41 and are interconnected by a U-shaped spring 42 which normally biases the arms apart to the tape cassette engaging positions shown in FIG. 2.

The wheel 31 (FIG. 3) and certain other components of the spindle drive assembly 32 are mounted on a lever 45 which is mounted to the chassis 20 by a pivot 46. The lever 45 is biased toward the right (as viewed in FIGS. 2 and 3) by a spring 47 which extends between a pin 45a on the lever 45 and a side 20a of the chassis 20.

Figure 4:
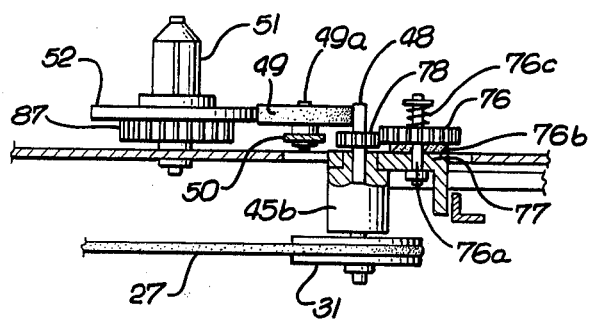
FIG. 4 is a transverse sectional view, as seen along the line 4—4 of FIG. 2, showing details of the spindle drive assembly during normal "forward" operation.
Figure 7:
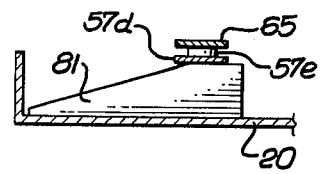
FIG. 7 is a transverse sectional view, as seen along the line 7—7 of FIG. 3, showing the ramp which restores the transfer lever to its normal horizontal location during the return transfer from the remote controlled rewind to the forward position.

As best seen in FIG. 4, the wheel 31 is attached to a shaft 48 that is journaled to a boss 45b integrally formed in the lever 45. In the normal forward drive mode shown in FIGS. 2, 3 and 4, the shaft 48 drives an idler wheel 49 having a shaft 49a which is mounted to an idler wheel carrier bar 50. The carrier bar 50 is mounted in a channel 45c on the lever 45 which has sufficient clearance to permit limited longitudinal and lateral movement of the bar.

In the normal forward drive configuration, the idler wheel 49 itself drives the incoming tape takeup spindle 51 via a friction disk 52. Thus while incoming messages are being recorded on the cassette 17, the takeup spindle 51 is being driven from the motor 26 via the belt 27, the wheel 31, the shaft 48, the idler wheel 49 and the friction disk 52. The manner in which the idler wheel 49 is biased into contact with the shaft 48 and the friction disk 52 is described below in connection with FIGS. 2 and 11.

The answering device 15 will accomplish remote controlled playout of incoming messages previously recorded on the cassette 17 upon receipt of an appropriate beep tone or other control signal during the outgoing announcement transmit portion of the answering cycle. This is accomplished using the inventive tape drive transfer system 55 best shown in FIGS. 3 and 5 through 8. Upon receipt of the remote control signal, the system 55 initiates fast rewind of the message tape cassette 17, followed by remote playout as the tape again is driven in the forward direction.

To accomplish this, detection of the beep tone or other remote control signal first causes the motor 26 to reverse its direction, and then causes a very low powered solenoid 56 to be energized. This solenoid does not itself effectuate the mechanical transfer required to rewind the tape. Rather, it causes the rack gear teeth 57a of a transfer lever 57 to be brought into mesh with a pinion gear 58 that is affixed to the flywheel 28. Since the motor 26 now is rotating the flywheel 28 in a counterclockwise direction, the resultant counterclockwise rotation of the pinion gear 58 will impart a leftward movement to the rack lever 57. The lever 57 thus will be moved from the "forward" position of FIG. 3 to the remote controlled rewind position of FIG. 8. As described below, this causes the spindle drive assembly 32 to switch the cassette 17 into a rewind mode.

As the transfer to the rewind mode is completed (FIGS. 6a through 6b), the lever 57 is moved vertically out of engagement with the pinion 58. Thus while the rewind is taking place, the transfer lever 57 is held in the orientation shown in FIGS. 6d and 8, with the solenoid 56 still energized. As soon as the tape has been completely rewound, the solenoid 56 is deenergized. This permits the lever 57 rapidly to be returned to the forward position (FIG. 3), primarily under force of the spring 47. The tape cassette 17 now is driven in the forward direction. The recorded messages are picked up by the head 39 and transmitted over the telephone line to the user.

The transfer lever 57 itself is not directly mounted to the assembly lever 35, but is connected thereto by a spring 59. A depending arm 57b of the lever 57 is provided with a slot 57c through which extends a boss 45d affixed to the drive assembly lever 45. The U-shaped spring 59, the force of which is greater than the spring 47, interconnects the lever 45 to the depending arm 57b of the transfer lever 57. Thus when the gear 58 engages the teeth 57a so as to move the transfer lever 57 toward the left (as viewed in FIGS. 3 and 8), this leftward movement is communicated from the lever 57 via the spring 59 to the spindle assembly lever 45. The lever 45 thus moves clockwise about the pivot 46 from the position shown in FIG. 3 to the position shown in FIG. 8. An optional boss 45e extending through a curved slot 61 in the chassis 20 may be used to guide the lever 45 during this motion. As described below in connection with FIGS. 9, 10 and 11, the clockwise rotation of the lever 45 to the position of FIG. 8 conditions the spindle drive assembly 32 into the rewind mode.

In the normal forward mode (prior to receipt of the remote playout control signal), the transfer lever 57 is situated at the same horizontal level as the pinion 58 (as evident in FIG. 6a), but is spaced away from the pinion 58 (FIG. 3) so as to leave a slight gap 64 therebetween. This gap is facilitated by the slight pivotal movement of the transfer lever 57 about the boss 45d. The plunger 56a of the solenoid 56 is connected to an extension 57d of the transfer lever 57 via a pivot connecter 56b, a flat elongated link 65 and a pivot connecter 57e. The force of a compression spring 56c in the solenoid 56 and an optional extension spring 66 (connected between the lever extension 57d and a tab 20b struck from the chassis 20) normally biases the transfer lever 57 to the position shown in FIG. 3 in which there is a gap 64 between the rack teeth 57a, and the pinion 58. An inverted L-shaped stop 67 (FIGS. 3 and 5) both limits the extent of clockwise pivoting of the transfer lever 57 about the boss 45d and limits the vertical (upward) movement of the lever 57 to prevent it from touching the bottom of the flywheel 28.

When the remote playout control signal is received and the solenoid 56 is energized, the plunger 56a is pulled into the solenoid body thereby causing the transfer lever 57 to rotate counterclockwise about the pivot 45d until the rack teeth 57a mesh with the pinion 58. The transfer lever 57 is slightly guided in this movement by another boss 45f on the drive assembly lever 45 which seats within an angled slot 57f in the lever 57. As soon as the teeth 57a engage the pinion 58, the transfer lever 57 quickly is driven leftward toward the rewind position (FIG. 8) under motive power supplied from the motor 26 via the flywheel 28 and pinion 58.

Very little force need be exerted by the solenoid 56 to initiate the transfer to the rewind position. The only force required is that necessary to overcome the relatively weak force of the spring 56c (and of the optional spring 66) and to rotate the transfer lever 57 through a very short angle into contact with the pinion 58. Thereafter, the actual motive force required to condition the answering device 15 to the rewind mode is provided by the same motor 26 that normally drives one or the other of the tape cassettes 16, 17.

Once the transfer to the rewind condition has been accomplished, it is necessary to disengage the rack gear 57a from the pinion 58, since the motor 26 (and hence the pinion 58) will thereafter continue turning so as to perform the actual tape rewind operation. The manner in which the rack 57a is disengaged from the pinion 58 is illustrated in FIGS. 6a through 6d.

Referring thereto, the underside of the transfer lever 57 is provided with a stop member 57g. Advantageously, this stop member 57g is formed from a generally square or U-shaped piece of spring steel wire that is affixed to the underside of the transfer lever 57. Alternatively, the stop member 57g may comprise an integral tab that is folded down from the lever 57. As the lever 57 is moving toward the left (FIG. 6b), the stop member 57g rides across the top of a stop tab 68 which is bent up from the chassis 20. This has the effect of maintaining the transfer lever 57 at the same horizontal level as the pinion 58 throughout substantially the entire distance of leftward travel.

Figure 6A:
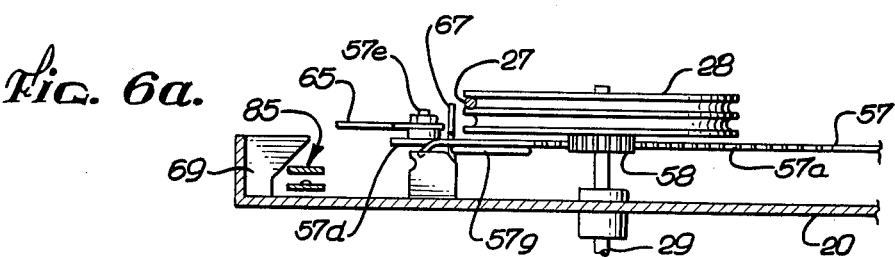
FIG. 6a is a transverse sectional view, as seen along the line 6—6 of FIG. 3, showing the transfer lever component of the drive transfer mechanism in the "forward" or normal answering mode position.
Figure 6B:
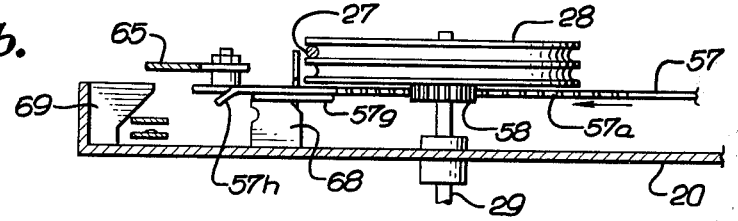
FIGS. 6b and 6c are transverse sectional views like FIG. 6a but showing the transfer lever in intermediate stages during transfer to the "rewind" position.
Figure 6C:
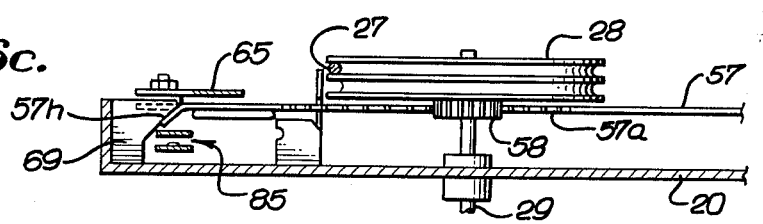
Figure 6D:
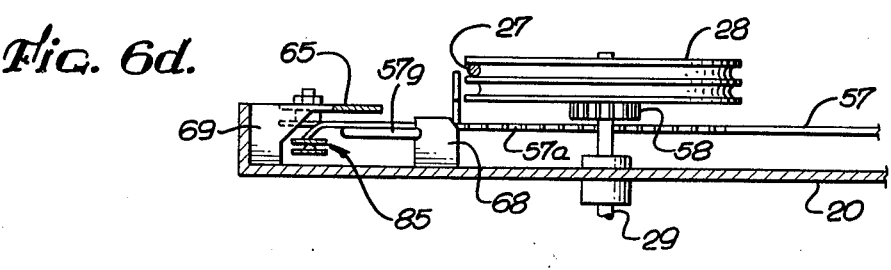
FIG. 6d is a transverse sectional view like FIG. 6a but with the transfer lever shown in the "rewind" position corresponding to that of FIG. 8.

When the transfer lever 57 reaches the extreme left position, a downwardly bent tab 57h at the left end of the lever 57 engages the underside of a wedge 69 that is mounted to the chassis 20 (FIG. 6c). Continued leftward motion of the lever 57 (imparted by the pinion 58) causes the tab 57h to ride downwardly on the wedge 69, thereby urging the lever 57 sufficiently far downward (as viewed in FIGS. 6a–6d) so as to disengage the rack 57a from the pinion 58.

As soon as this occurs, the spring 47 (acting via the lever 45 and the spring 59) immediately urges the transfer lever 57 toward the right. However, the solenoid 56 is still energized so that the transfer lever 57 remains in the position in which the stop member 57g is aligned with the stop tab 68. Thus the member 57g forceably abuts against the stop tab 68 as the spring 47 urges the lever 57 toward the right. Some of the force of impact is absorbed by the spring steel wire of the member 57g. Of course, such engagement of the member 57g with the stop tab 68 (FIG. 6d), immediately stops the rightward movement of the transfer lever 57, maintaining the drive transfer system 55 firmly in the position illustrated in FIG. 8. Rewinding of the tape cassette 17 occurs in this position. Since the solenoid 56 remains energized, the transfer lever 57 cannot pivot counterclockwise about the boss 45d, thereby ensuring that the stop member 57g will remain in firm contact with the stop tab 68.

Figure 8:
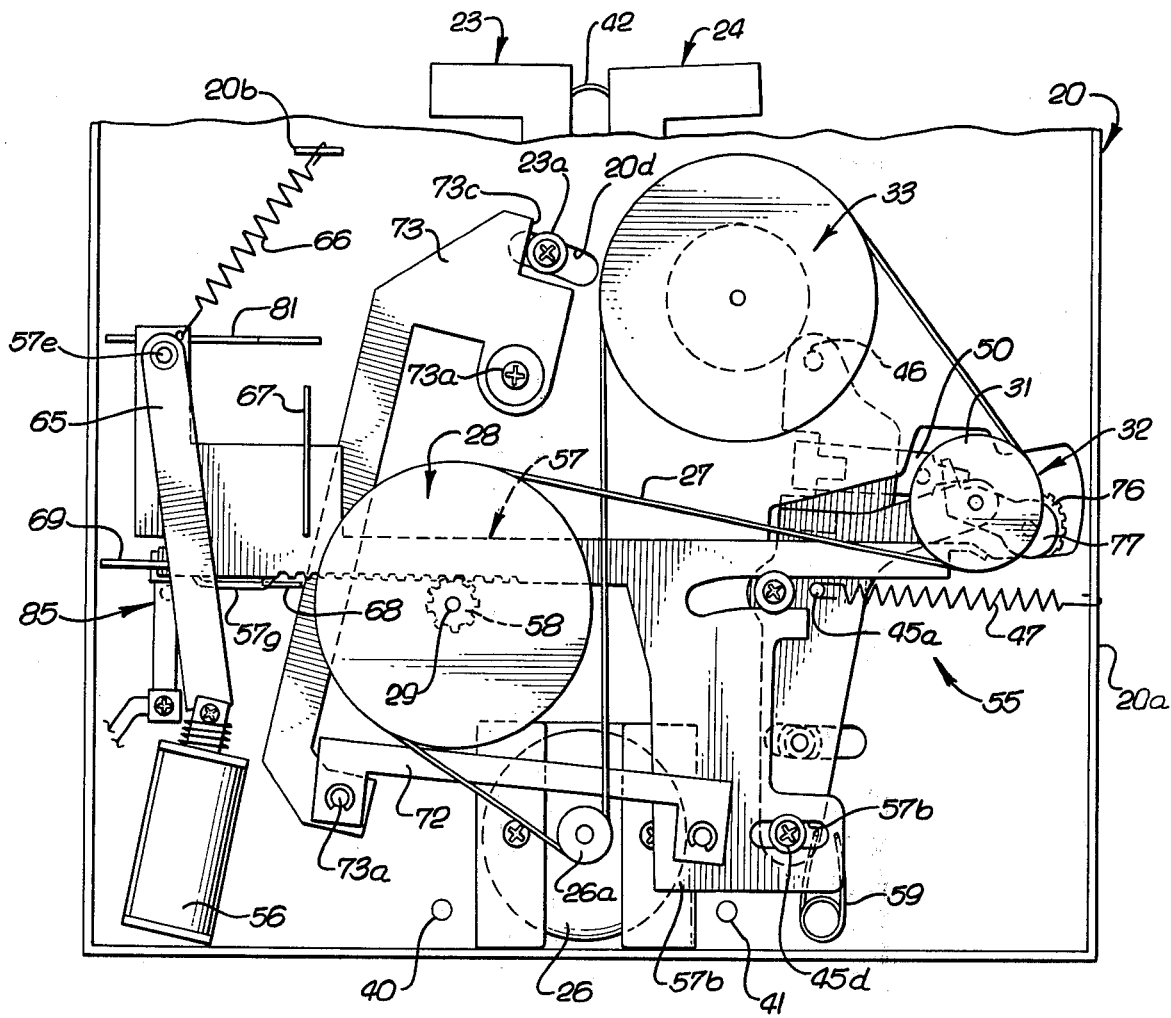
FIG. 8 is a bottom plan view like FIG. 3, but with the drive transfer mechanism in the "rewind" position.

As the transfer lever 57 was driven toward the left, it rotated the spindle drive assembly lever 45 clockwise (as viewed in FIGS. 3 and 6) about the pivot 46. Force is transferred from the transfer lever 57 to the lever 45 via the spring 59. During this travel, the lever 45 may reach its stop position before the transfer lever 57 reaches the extreme leftward position (FIG. 6c) in which the tab 57h engages the wedge 69. In such instance, overtravel of the transfer lever 57 is facilitated by a lost motion which permits the transfer lever 57 and its depending arm 57b freely to move toward the left with respect to the lever arm 45. During such movement the boss 45d moves within the slot 57c, compressing the spring 59. As soon as the transfer lever 57 becomes disengaged from the pinion 58 (FIG. 6d), the spring 59 aids the spring 47 in urging the transfer lever 57 back toward the right until the stop member 57g abuts against the stop tab 68. Typically when this position is reached, the spring 59 will still be somewhat compressed, as illustrated in FIG. 8. Thus the pivot 45d and the slot 57c cooperately form a lost motion linkage between the lever 45 and the transfer lever 57.

Leftward movement of the transfer lever 57 moves the carrier arm 24 to the "rewind" or partially retracted position in which the pinch roller 38 is disengaged. This is accomplished by the action of a peg 45g (FIGS. 2 and 9) which projects upwardly from the lever 45 in abutment with an integral projection 24a extending from the control arm 24. As the lever 45 rotates counterclockwise (as shown in FIG. 9) during leftward movement of the transfer lever 57, the pin 45g pushes the projection 24a and hence the carrier arm 24 from the engaged position of FIG. 2 to the "rewind" position of FIG. 9.

Figure 9:
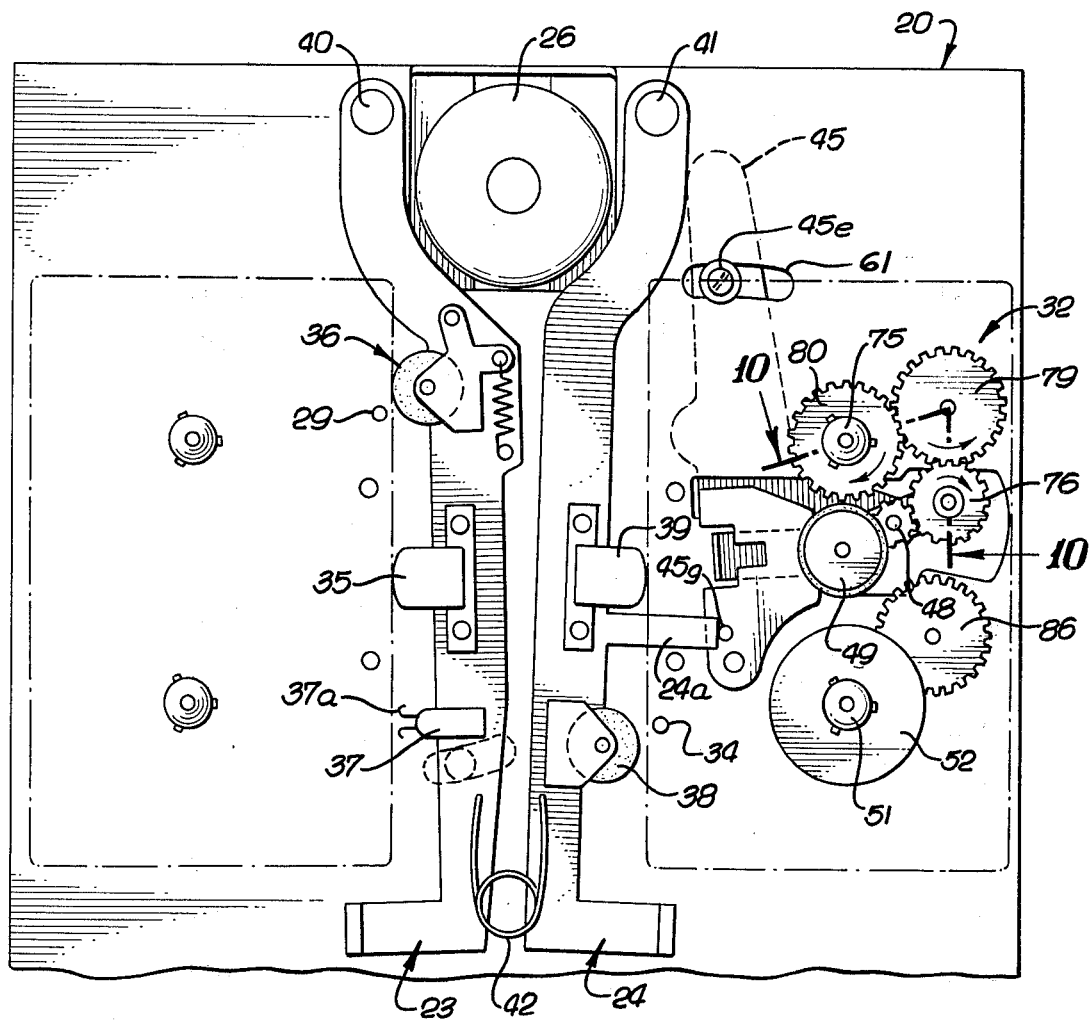
FIG. 9 is a top plan view like FIG. 2, but with the drive transfer mechanism in the "rewind" position (corresponding to FIG. 8).

As an option useful with remote controlled fast forward, movement of the transfer lever 57 to the remote rewind position (FIG. 8) may also retract the carrier arm 23 from the engaged position of FIG. 2 to the retracted position of FIG. 9. This is accomplished by a pair of arms 72, 73 (FIGS. 3 and 8) which are connected together by a pivot 73a. The other end of the arm 72 is connected to the depending arm 57b of the transfer lever 57 by a pivot 72a. The arm 73 is connected to the chassis 20 at a pivot 73b. The pivot 73b is positioned so that when the lever 57 is moved toward the left, an extending shoulder 73c of the arm 73 will swing clockwise through an arc about the pivot 73b. A peg 23a projects downwardly from the carrier arm 23 through a slot 20d in the chassis 20. The pin 23a is positioned to abut against the shoulder 73c. Thus when the transfer lever 57 is moved to the left, the combined lever action of the arms 72 and 73 pushes the peg 23a and hence the carrier arm 23 clockwise (as viewed in FIGS. 3 and 8) into the retracted position shown in FIG. 9.

Figure 10:
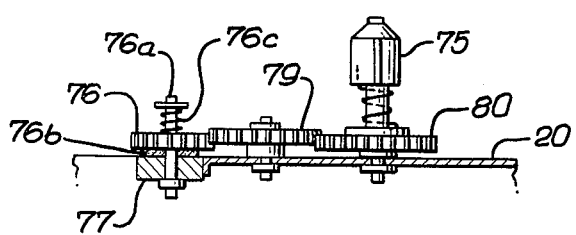
FIG. 10 is a transverse sectional view, as seen along the line 10—10 of FIG. 9, showing the gear arrangement of the spindle drive assembly during remote controlled rewind.
Figure 11:
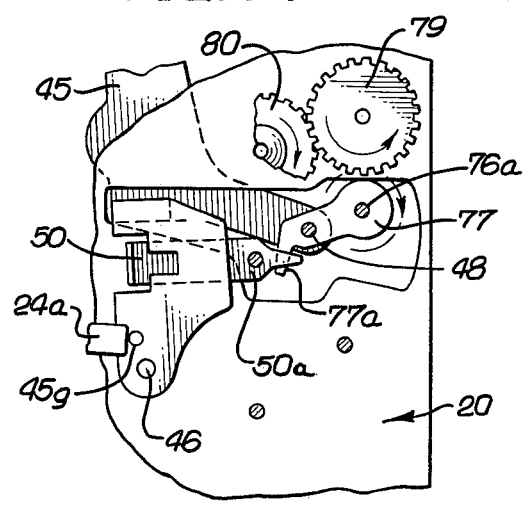
FIG. 11 is a fragmentary top plan view, like FIG. 9, but with certain gears not shown so as to expose the pivoted floating arm which holds one of the drive gears, and which is oriented to the remote controlled rewind position.

During remote controlled rewind, the supply spindle 75 of the message tape cassette 17 is gear driven under motive power supplied by the motor 26 and the wheel 31. The gear arrangement during rewind is shown in FIGS. 9, 10 and 11. Referring thereto, the spindle drive assembly 32 includes an idler gear 76 the shaft 76a of which is mounted on a "floating" arm 77 (FIG. 11) which itself is pivotally mounted or journaled to the shaft 48. A friction pad 76b of felt or like material is situated between the bottom of the gear 76 and the arm 77. A spring 76c situated between a shoulder at the top of the shaft 76a and the gear 76 biases that gear downward against the pad 76b and the arm 77.

Affixed to the shaft 48 is a gear 78 which is directly driven by the wheel 31. The gear 78 rotates counterclockwise (as viewed from the top in FIG. 9) during counterclockwise rotation (as viewed from the bottom in FIG. 3) of the motor 26. The gear 78 meshes with the gear 76 (FIG. 9) that is mounted on the floating arm 77. The counterclockwise rotation of the gear 78 causes the arm 77 to swing counterclockwise (as viewed from the top in FIG. 11) about the shaft 48. Such swinging motion is imparted to the arm 77 by the friction drag assembly including the gear 76, the friction pad 76b and the bias spring 76c. As the gear 78 begins to rotate counterclockwise, rotation of the gear 76 is impeded as a result of the drag imposed by the friction pad 76b. Thus force is transmitted from the gear 78 via the gear 76 and the friction pad 76b to the arm 77. This drag-imposed force swings the arm 77 in the counterclockwise direction, thereby bringing the gear 76 into engagement with a fixed idler gear 79 that is mounted to the chassis 20. The gear 79 thereafter imparts rotation to a gear 80 that is connected to the spindle 75.

When rewind of the message tape cassette 17 is complete, the solenoid 56 is deenergized. The force of the spring 56c (and the optional spring 66) causes the linkage 65 to pivot the transfer lever 57 slightly clockwise with respect to the boss 45d. This motion is sufficient to remove the stop member 57g away from the stop tab 68. The transfer lever 57 then is quickly moved to the right and restored to the "forward" position of FIG. 3 primarily through the force of the spring 47. During such rightward motion, the transfer lever 57 also is urged vertically back into the same plane as the pinion 58 by the action of a wedge 81 (FIG. 7) attached to the chassis 20.

Since the motor 26 is still rotating counterclockwise (as it was during both the incoming message record operation and during the remote controlled rewind), the message tape in the cassette 17 will now be driven in the forward direction. Further, since the spindle drive assembly lever 45 now is returned to its rest position (FIG. 2), the force of the spring 42 will return the control arm 24 to the "forward" position. Accordingly, the driven capstan 34 and pinch roller 38 will impart forward motion to the tape, the messages from which will be picked up by the head 39 for transmission to the telephone line. The drive assembly 32 will drive the spindle 51 via the idler 49, so that the tape will be wound onto the take-up spindle. In this manner, the previously recorded calls will be played out automatically, under remote control, to the user who has telephoned in to receive his messages.

During forward movement of the message tape in the cassette 17 (during either incoming message record or remote playout), the drive assembly 32 is in the position shown in FIG. 2, with the gear 78 rotating in the counterclockwise direction (as viewed from above). This rotation is imparted to the floating arm 77 via the otherwise unengaged gear 76 and the friction pad 76b. The resultant counterclockwise pivoting of the arm 77 causes a finger 77a (FIG. 11) to engage a tab 50a on the carrier bar 50, so as to urge that carrier bar toward the right. This movement is imparted to the idler wheel 49, the shaft of which is attached to the carrier bar 50, thereby urging the idler wheel 49 into tight contact with the shaft 48 and the friction disk 52, as shown in FIG. 2. Positive drive of the take-up spindle 51 thereby is achieved during normal forward tape motion.

An optional feature of the present invention is the incorporation of a fast forward capability which also can be remote controlled. For telephone answering devices so equipped, the user who wishes to hear his messages can operate the system in the remote controlled playout mode described above. However, during message playout, the user has the capability of fast forwarding the tape on the cassette 17, for example to skip over messages which he does not wish to hear.

Figure 13:
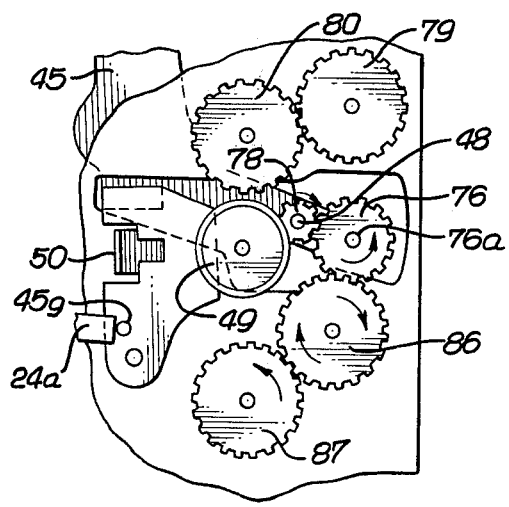
FIG. 13 is a top plan view like FIG. 12 during fast forward operation, but with all gears shown so as to illustrate the complete drive train.
Figure 12:
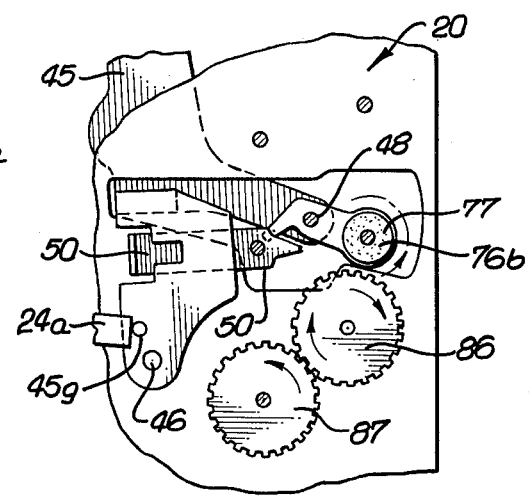
FIG. 12 is a fragmentary top plan view like FIG. 11, but with the floating arm and associated gear pivoted to the fast forward position.

To initiate such fast forward operation, the user sends a separate fast forward control signal over the telephone line while a message is being played out. For example, this signal may consist of a certain binary code which is detected by a circuit (known per se) to initiate fast forward operation. Upon receipt of such signal, two separate operations take place. First, the solenoid 56 is energized (with the motor 26 still turning in the counterclockwise direction as viewed in FIGS. 2 and 8), so that the tape drive transfer system 55 will transfer (as described above) into the "rewind" configuration shown in FIG. 8. As soon as this is accomplished, as confirmed by closure of a switch 85 by the depending tab 57h, at the end of the transfer lever 57 (FIG. 6d), the direction of rotation of the motor 26 is reversed. The motor 26 now rotates clockwise (as viewed from the bottom in FIG. 8), so that the wheel 31 will rotate counterclockwise (as viewed in FIG. 8). This will cause the gear 78 to rotate clockwise (as viewed from the top in FIG. 13). Since the gear 78 meshes with the gear 76 that is mounted on the floating arm 77, the clockwise rotation of the gear 78 and the cooperation of the gear 76 and the friction pad 76b will cause the arm 77 to rotate clockwise about the pivot 48 into the position shown in FIGS. 12 and 13. In this position, the gear 76 meshes with an idler gear 86 that is mounted to the chassis 20. The gear 86 in turn meshes with a gear 87 that is associated with the take-up spindle 51. As a result, rapid rotation is imparted to the take-up spindle 51 so as to provide a fast forward action for the tape in the cassette 17.

Notice that while this fast forward operation is going on, the tape drive transfer system 55 is in the position shown generally in FIG. 8 with both of the carrier arms 23, 24 in their retracted positions shown in FIG. 9. The carrier arm 24 retraction position may be selected so that the pinch roller 38 is out of contact with the capstan 34, but with the playback head 39 still in sufficient contact with the tape so as to pick up audio therefrom. The presence of this audio, transmitted via the telephone line, informs the user that messages are present on the portion of the tape that is being fast forwarded.

Since the carrier arm 23 is retracted, thereby removing the pinch roller assembly 36 from the capstan 29, no movement is imparted to the outgoing announcement tape in the cassette 16 even though the capstan 29 itself is rotating in the drive direction as a result of the clockwise rotation of the motor 26. Thus the fast forward operation can proceed in an unimpeded manner. (As noted earlier, retraction of the carrier arm 23 when the tape drive transfer system 55 is actuated is required only in units having the fast forward option. If this option is not provided, the link arms 72, 73 and the pin 23a (FIG. 3) all can be eliminated, since retraction of the carrier arm 23 is not necessary during the remote controlled rewind operation itself.)

At the end of the requisite fast forward movement, the user transmits another control signal to the device 15. This control signal causes the solenoid 56 to be deenergized so that the tape drive transfer system 55 will return to the normal "forward" configuration of FIG. 3. The signal also causes the motor 26 to reverse its direction (to counterclockwise, as viewed from the bottom in FIG. 8). The answering device 15 then is returned to "forward" operation so that additional messages can be remotely transmitted to the user.

I claim:

1. In a telephone answering device in which incoming messages recorded on a magnetic tape cassette can be played out under remote control, said device having at least one cassette drive motor, the improvement comprising:
   spindle drive assembly means having forward and rewind operating positions for respectively alternately motor driving either the take-up spindle or the source spindle of said cassette, and
   a tape drive transfer system having;
   a transfer lever connected to said drive assembly means and biased to a first position in which said drive assembly means is in said forward operating position, and
   solenoid means, actuated in response to receipt of a remote playout control signal and linked to said transfer lever, for offsetting said transfer lever into driven relationship with one cassette drive motor, said one cassette drive motor thereafter driving said transfer lever from said first position to a second position in which said drive assembly means is in said rewind operating position.

2. The improvement of claim 1, wherein said tape drive transfer system further comprises:
   latch means, operative when said one cassette drive motor has driven said transfer lever to said second position and said solenoid means still is actuated, for causing said transfer lever to latch and remain in said second position, deactuation of said solenoid means upon completion of rewind of the tape in said cassette causing unlatching of said transfer lever, said transfer lever thereafter being biased back to said first position.

3. The improvement of claim 1 or 2, wherein said transfer lever includes a rack gear, wherein said solenoid means pivots said transfer lever to engage said rack gear against a pinion driven by said one cassette drive motor, and wherein said latch means includes vertical offset means for disengaging said transfer lever from said pinion when said transfer lever reaches said second position.

4. In a telephone answering device in which incoming messages recorded on a magnetic tape cassette can be played out under remote control, the improvement comprising:
   a spindle drive assembly mounted on a pivotal spindle drive assembly lever and having forward and rewind operating positions for respectively alternately driving either the takeup spindle or the source spindle of said cassette from the same motor, said assembly also having means for retracting the capstan pinch roller associated with said cassette when said spindle drive assembly lever is transferred to the rewind operating position, and
   a tape drive transfer system having:
   a transfer lever including a rack gear, said transfer lever being connected to said spindle drive assembly lever and being pivotable with respect thereto through a limited angle permitting movement of said rack gear into and out of engagement with a pinion that is driven by said same motor,
   a low power solenoid linked to said transfer lever, including first bias means for pivotally biasing said transfer lever out of engagement with said pinion when said solenoid is deactuated, actuation of said solenoid slightly pivoting said transfer lever so as to bring said rack gear into engagement with said pinion, said same motor thereby driving said transfer lever from a first position in which said spindle drive assembly lever is in said forward operating position to a second position in which spindle drive assembly lever is in said rewind operating position,
   disengagement and latching means, operative when said transfer lever has reached said second position, for disengaging said transfer lever from said pinion and for latching said transfer lever in said second position while said solenoid remains actuated, said same motor thereafter providing driving force to rewind the tape in said incoming message cassette, completion of such rewind causing deactuation of said solenoid and concomitant unlatching of said transfer lever, and second bias means, operative when said solenoid is deactuated, for returning said transfer to said first position in which said spindle drive assembly lever is in such forward position.

5. The improvement of claim 4 wherein said transfer lever extends substantially in a horizontal plane, wherein said first bias means pivots said transfer lever substantially in a horizontal plane, and wherein said disengagement and latching means accomplishes disengagement by slightly tilting said transfer lever vertically out of said horizontal plane so as to disengage said rack gear from said pinion.

6. The improvement of claim 5 wherein said disengagement and latching means comprises;

a first wedge against which an end of said transfer lever slides at the end of the travel imparted to said transfer lever by said pinion and rack gear, said sliding causing said transfer lever to tilt vertically out of said horizontal plane sufficiently to disengage said rack gear from said pinion, and a stop member on said transfer lever which engages a stop tab affixed to the chassis of said answering device when said transfer lever has been tilted by said wedge, said stop member being retained against said stop tab by the bias force of said second bias means while said solenoid remains actuated, said stop member being withdrawn from said stop tab as said transfer lever is pivoted by said first bias means when said solenoid is deactuated.

7. In a spindle drive assembly for a magnetic tape cassette, the improvement comprising:

a drive gear driven by a motor, an arm mounted freely to pivot about the shaft of said drive gear, a transfer drive gear carried by said arm and meshing with said drive gear, and friction means for creating a drag between said transfer drive gear to said arm, whereby rotation of said drive gear in a selected direction will impart a pivoting force to said arm via said transfer drive gear and said friction means, said imparted force urging said arm to pivot in said same selected direction, and first and second additional gears respectively associated with the source spindle and takeup spindle for said tape cassette, said transfer drive gear respectively engaging said first or said second additional gear depending on the pivotal orientation of said arm, whereby rotation of said drive gear in a first direction will cause said arm to pivot to a first orientation in which said transfer drive gear engages said first additional gear so as to drive the source spindle of said tape cassette, and whereby rotation of said drive gear in the opposite direction will cause said arm to pivot in the opposite direction to a second orientation in which said transfer gear engages said second additional gear so as to drive the takeup spindle of said tape cassette.

8. The improvement of claim 7 wherein said spindle drive assembly further comprises an idler wheel carried by a carrier bar that is movable laterally with respect to the shaft of said drive gear, and wherein said takeup spindle has an associated friction disk, and wherein;

an integral finger is provided at one end of said arm, said finger engaging a tab on said carrier bar so that rotation of said drive gear in a certain direction, with the concomitant pivoting of said arm in the same direction, will cause said finger to pull said tab and carrier bar in a direction in which said idler wheel will engage said shaft and said friction disk in a firm driving relationship therebetween.

* * * * *